No. 889,800. PATENTED JUNE 2, 1908.
H. A. MURRY & J. W. EVANS
FERTILIZER DISTRIBUTER.
APPLICATION FILED OCT. 16, 1907.
2 SHEETS—SHEET 1.
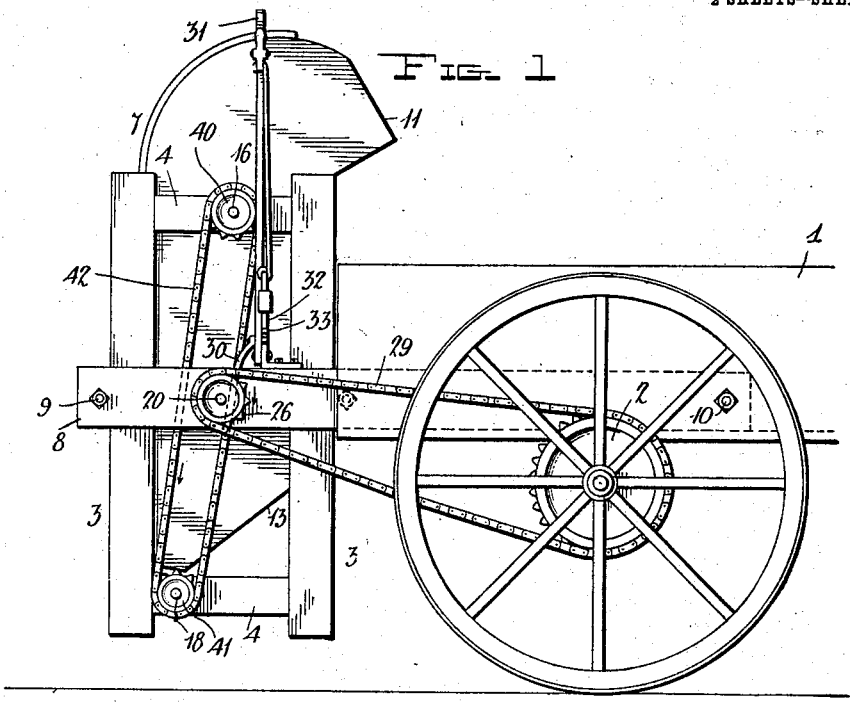
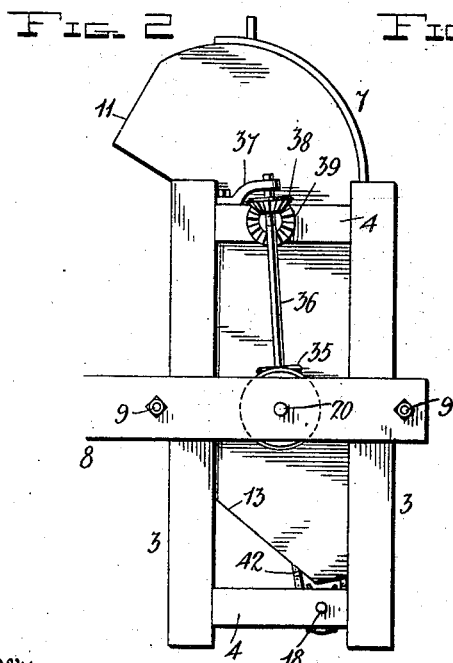
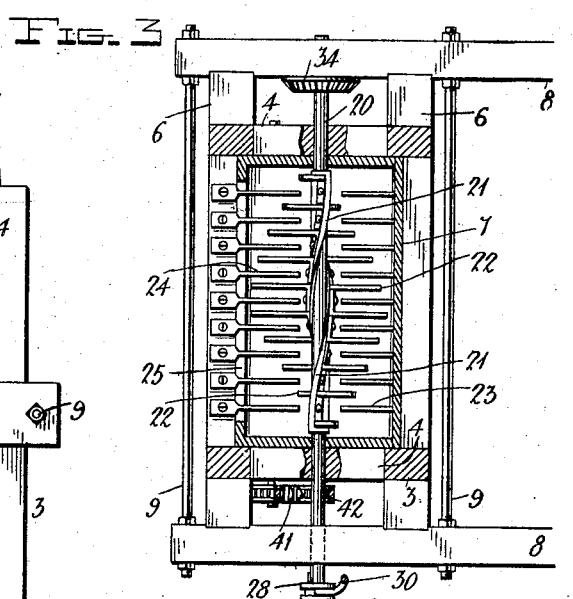
Witnesses
I. Jenkins
C. C. Hines
Inventors
Henry A. Murry,
James W. Evans.
By Victor J. Evans
Attorney No. 889,800. PATENTED JUNE 2, 1908.
H. A. MURRY & J. W. EVANS.
FERTILIZER DISTRIBUTER.
APPLICATION FILED OCT. 16, 1907.

2 SHEETS—SHEET 2.

Witnesses

Inventors
Henry A. Murry,
James W. Evans
By Victor J. Evans
Attorney

UNITED STATES PATENT OFFICE.

HENRY A. MURRY AND JAMES W. EVANS, OF DAWSON, TEXAS.

FERTILIZER-DISTRIBUTER.

No. 889,800.　　　　Specification of Letters Patent.　　Patented June 2, 1908.

Application filed October 16, 1907. Serial No. 397,673.

*To all whom it may concern:*

Be it known that we, HENRY A. MURRY and JAMES W. EVANS, citizens of the United States, residing at Dawson, in the county of Navarro and State of Texas, have invented new and useful Improvements in Fertilizer-Distributers, of which the following is a specification.

This invention relates to fertilizer drills or distributers, the object of the invention being to provide a device of this character which is simple of construction and inexpensive of production, adapted to be readily applied upon the rear end of the bed of an ordinary farm wagon for use, and constructed to efficiently break up or comminute the material and deliver the same in a pulverized condition to the soil.

The invention consists of the novel features of construction, combination and arrangement of parts hereinafter fully described and claimed, reference being had to the accompanying drawings, in which:—

Figure 4:
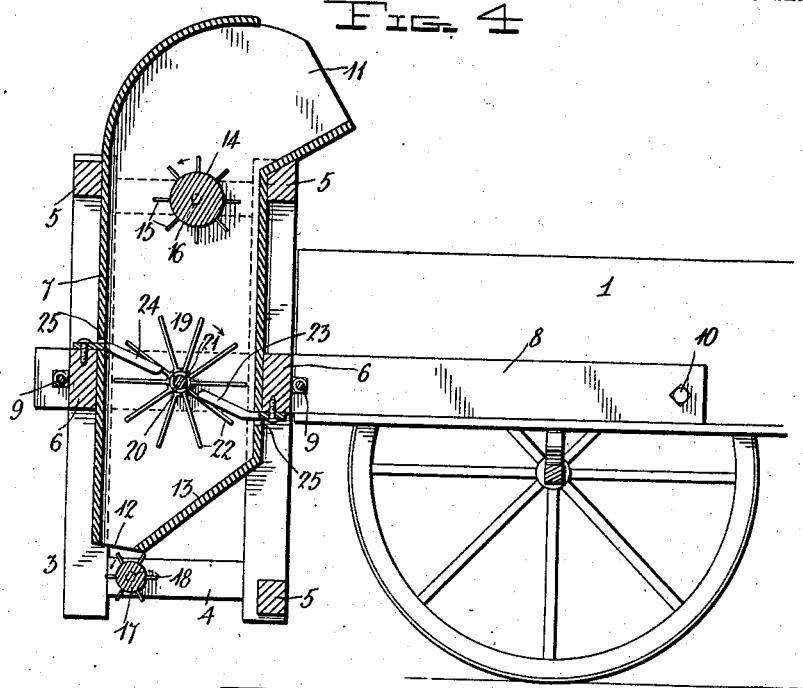
Figure 5:
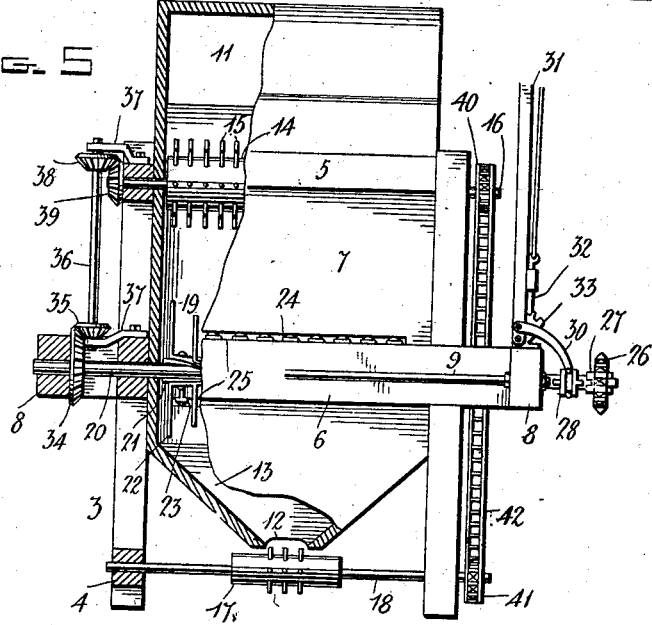

Figure 1 is a side view showing the application of the invention to the bed of a wagon. Fig. 2 is an opposite side elevation of the distributer detached. Fig. 3 is a sectional plan view on the line of the pulverizing devices. Fig. 4 is a vertical front to rear section. Fig. 5 is a rear elevation, partially in section.

The device is designed to be applied upon the rear end of the bed of a farm wagon or equivalent vehicle in which the fertilizer is stored for distribution as the vehicle is driven across the field. This bed 1 may be of ordinary box construction, and, as shown, the rear axle or one of the wheels of its running gear has fixed for rotation therewith a sprocket drive gear 2, whereby the disintegrating mechanism of the distributer is operated as hereinafter described.

The distributer comprises a frame of suitable construction, which, as shown in the present instance, comprises pairs of side bars 3, the bars of each pair being connected by upper and lower bars 4 and the front and rear bars of the opposite pairs reënforced and connected by upper and lower front and rear cross bars 5 and intermediate cross bars 6, the several bars of the frame being bolted or otherwise suitably united and forming a cage or receptacle for the distributer casing 7 which fits therein and is suitably secured in position. Coupling bars 8 are secured at their rear ends to the sides of the frame and strengthened by interconnecting tie-bolts 9, and the forward ends of these bars are properly spaced to lie on opposite sides of the bed 1 and to be secured thereto by bolts or other proper fastenings 10, whereby the distributer is detachably secured in position for operation at the rear end of the bed. By disconnecting the bolts 10 the device may be detached from the vehicle when its further use is not required.

The casing 7 is provided at its upper forward end with a mouth or inlet opening 11 through which the fertilizer may be shoveled or otherwise introduced thereinto, and is also provided at its lower rear end with an outlet 12, toward which the bottom wall 13 of the casing is inclined or sloped to direct the flow of the pulverized material therethrough.

Extending across the top of the casing below the mouth 11 is a breaking cylinder 14 provided with peripheral fingers 15 by which the material is primarily partially broken up on its introduction. This cylinder is mounted on a shaft 16 journaled in bearings in the side wall of the casing and extending outwardly beyond the same. Below the discharge outlet a wheel or cylinder 17 is arranged and located in advance of the center line of the outlet and provided with fingers 18 to engage the discharging material and force the same rearwardly and downwardly, thus insuring proper distribution of the fertilizer to the soil and preventing clogging of the outlet. This cylinder is mounted on a shaft 18 journaled in the lower bars 4 and extended at one end beyond the frame. The two cylinders 14 and 17 are respectively driven rearwardly and downwardly by gearing of a suitable character, as hereinafter described.

Arranged between the two cylinders before mentioned and about intermediately of the length of the body of the casing is a rotary pulverizing wheel or cylinder 19, comprising a shaft 20 extending transversely of the casing and having its ends extending through and journaled in the sides thereof. Strips 21 are secured to the shaft and extend spirally around the same and form supports for a series of stirring or pulverizing blades or fingers, projecting at right angles to the shaft and spirally there around. These fingers coöperate with front and rear sets 23 and 24 of stationary stirring or pulverizing blades fixed respectively to the lower and upper surfaces of the front and rear intermediate cross bars 6 and extending into the casing through slots 25 in the front and rear walls thereof. The blades of both series are arranged edgewise in a vertical plane, and the blades of each series are disposed in parallel relation to each other and in horizontal planes coinciding with the blades of the other series, the arrangement of the blades of both series further being such that they lie on lines between the fingers of the pulverizing cylinder. The said pulverizing cylinder 19 rotates in a forward and downward direction and its fingers gather and act upon the fertilizer and, in addition to tossing the same up and down, exert a disintegrating action thereon and coöperate with the blades 23 and 24 to break up and pulverize all the large and hard particles, thus properly preparing the fertilizer for the soil. By the arrangement of the sets of blades 23 and 24 at an upward and downward inclination, edgewise into vertical plane and in parallel relation to work between the fingers 22 as the cylinder rotates, the particles of the fertilizing substance are thrown downwardly and forwardly, cut up by said fingers and blades and crushed in their downward passage through the restricted spaces therebetween, by which all the material will be deposited upon the inclined bottom 13 in a well comminuted condition. The comminuted material thus prepared slides by gravity down the wall 13 and out through the outlet 12 and is swept downwardly and rearwardly by the distributing cylinder 17.

A sprocket pinion 26 is loosely mounted upon one end of the shaft 20 and is provided with a clutch hub 27 adapted to be engaged by an annularly grooved clutch sleeve 28 feathered to slide upon and rotate with said shaft, and said pinion is connected to the drive gears 2 by a sprocket chain 29 to drive the pulverizing cylinder in a forward direction during the passage of the vehicle across the field. A forked shifting arm 30 projects into the groove in the sleeve 28 and is pivotally connected with a laterally swinging lever 31 mounted upon the adjacent coupling bar 8, by which the sleeve may be shifted into and out of engagement with the pinion to start and stop the operation of the pulverizing mechanism. The lever 31 is provided with the usual pawl 32 adapted to engage a stationary rack 33, whereby it may be secured in adjusted position. The opposite end of the shaft 20 carries a beveled gear 34 meshing with a beveled pinion 35 on the lower end of a vertical shaft 36 journaled in brackets 37 on the side of the frame of the casing opposite the lever 31. The upper end of this vertical shaft carries a beveled pinion 38 meshing with a corresponding pinion on the adjacent end of the shaft 16, whereby in the operation of the apparatus the upper breaking cylinder 14 will be rotated rearwardly to throw the material in a downward and rearward direction. Sprocket pinions 40 and 41 are mounted upon the extended ends of the shafts 16 and 18 on the side of the apparatus adjacent to lever 31 and are connected by a chain 42 whereby the motion of the shaft 16 will be communicated to the shaft 18 to drive the distributing cylinder 17 in the same direction.

The operation of the distributer will be readily understood from the foregoing description, and it will be seen that the invention provides an apparatus of this character which may be conveniently applied to and removed from the bed of an ordinary wagon, which embodies simple and effective means for disintegrating or pulverizing and distributing the fertilizer, and in which such means may be readily thrown into and out of action at will, the apparatus as thus constructed being of a simple type and capable of being manufactured and sold at a low cost so as to be readily within the reach of agriculturists of average means.

Having thus described the invention, what we claim as new and desire to secure by Letters Patent is:—

1. In a fertilizer distributer, a casing provided at its upper forward end with an inlet and at its lower rear end with an outlet, the bottom wall of the casing being inclined toward said outlet, a rotary breaking cylinder arranged in the casing immediately below the inlet, a rotary distributing wheel journaled on the frame below the outlet, upper and lower sets of spaced breaking blades arranged within the casing between the breaking cylinder and outlet, said blades being arranged to form an inclined perforated shelf to feed the material downward and forward to the top of the inclined bottom and being spaced at their inner edges, a breaking wheel comprising an axle journaled on the frame between the sets of breaking blades and provided with a series of spirally arranged fingers to move between the blades of the sets, means for attaching the casing to a vehicle, means for driving the shaft of the spirally bladed breaking wheel, gearing for transmitting power from said shaft to the first named breaking wheel, and means for transmitting power from said wheel to the lower distributing wheel.

2. In a fertilizer distributer, a casing provided with inlet and outlet openings, and having an inclined bottom leading downwardly and rearwardly to the outlet opening, front and rear sets of disintegrating blades disposed within the casing, said blades being arranged at a downward and forward angle to effect the feed of the material to the upper portion of the inclined bottom, a pulverizing wheel having its axis disposed between the inner ends of the sets of blades and provided with spirally arranged fingers to move therebetween, and means for driving said wheel.

3. In a fertilizer distributer, a casing provided at its upper forward end with an inlet and at its lower rear end with an outlet, the bottom wall of the casing being inclined toward said outlet, a rear set of stationary breaking blades arranged within the casing between the inlet and bottom wall, a front set of stationary breaking blades arranged below said rear set and above the upper portion of the inclined bottom, said blades being respectively inclined downwardly and upwardly to lie in the same inclined plane, a shaft arranged between the inner ends of the sets of breaking blades, and spiral fingers on said shaft adapted to rotate between the breaking blades, and means for driving said shaft.

In testimony whereof, we affix our signatures in presence of two witnesses.

HENRY A. MURRY.
JAMES W. EVANS.

Witnesses:
   H. T. KENNEY,
   W. T. WESTMORELAND.